Patented Nov. 15, 1949

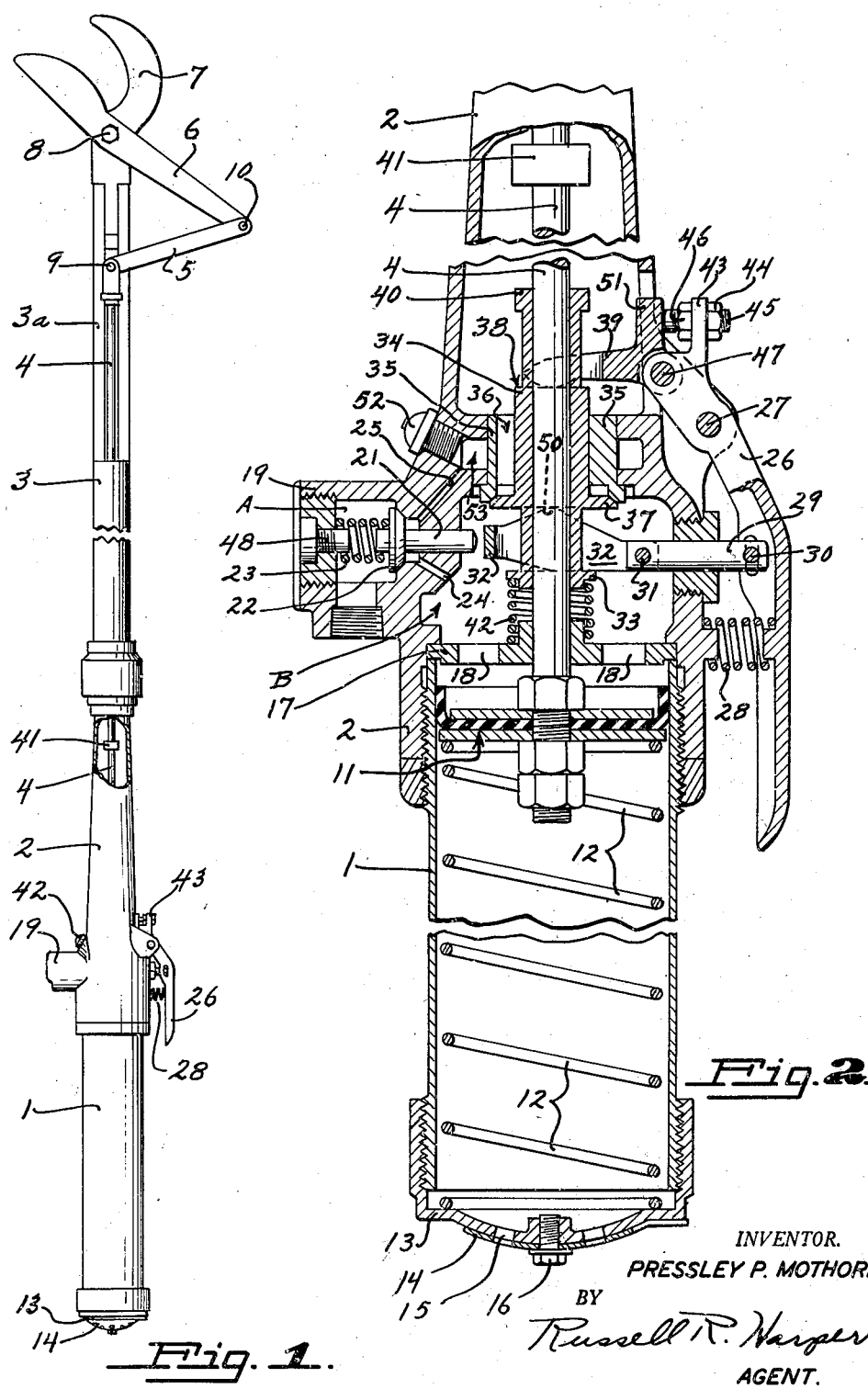

2,488,224

UNITED STATES PATENT OFFICE 2,488,224

PRESSURE FLUID SERVOMOTOR

Pressley P. Mothorn, Richmond, Calif.

Application May 10, 1945, Serial No. 593,022

14 Claims. (Cl. 121—38)

This invention relates to improvements in pressure fluid servo-motors, and more particularly to an improved servo-motor which is especially suited to serve as an actuating mechanism for pruning shears such as are employed in pruning fruit trees or the like.

During recent years power operated pruning shears have come into extensive use in the trimming of fruit and ornamental trees, shrubbery, and the like, particularly in the larger fruit orchards. The conventional power operated pruning shears, especially those which are pneumatically operated, suffer from certain inherent defects in that the smaller and more conveniently utilized shears are unreliable in operation for the heavy duty work encountered in fruit orchards and the like, whereas the equipment which is sufficiently rugged to withstand this type of operation is excessively heavy and rapidly tires the operator, rendering the machine uneconomical for this type of pruning.

It is an object of the present invention to provide improved pneumatically operated pruning shears which are light in weight and at the same time will withstand without failure the heavy duty pruning encountered in orchards, and the like. A further object is to provide improved pneumatically powered actuating mechanism for pruning shears and the like. Another object is to provide improved pruning shears which are readily freed by the operator if the shear becomes bound in endeavoring to cut a limb requiring power beyond the capacity of the apparatus. Still further objects are to provide an improved pneumatic pruning apparatus, in which fouling of the actuating mechanism is obviated, in which the speed of opening of the shears may be controlled, and in which perfect synchronization of the action of the exhaust valve and the shear actuating piston rod is attained.

Other objects, together with some of the advantages to be derived in utilizing the present invention, will become apparent from the following detailed description thereof, taken together with the accompanying drawing forming a part of the specification and wherein:

Figure 1 is an elevation of pruning shears constructed in accordance with the present disclosure; and Figure 2 is an enlarged sectional elevation of the operating mechanism of the shears.

In Figure 1 the pruning shears assembly comprises a piston cylinder 1, which is rigidly and detachably attached to the actuating mechanism housing 2 which, in turn, is attached to and coaxially disposed with respect to the actuating rod housing 3 which may be of any desired length. A cross-head guide 3a is formed as an extension of housing 3 and serves as a guide for cross-head 9, which is rigidly attached to the end of actuating rod 4.

Stationary shear blade 7 is rigidly and detachably mounted on the end of cross-head guide 3a and a second shear blade 6 is pivotally mounted thereon at 8. Link member 5 is pivotally attached to cross-head 9 and similarly attached to an extension of shear blade 6 at 10. It will be seen that shear blades 6 and 7 may be opened and closed by reciprocation of actuating rod 4, the shear blades closing as actuating rod 4 moves towards piston cylinder 1 and opening as it moves in the opposite direction. The mechanism shown in Figure 2 operates to provide controlled reciprocation of actuating rod 4.

Referring particularly to Figure 2, a piston element 11 is slidably mounted in piston cylinder 1 and rigidly attached to the lower end of actuating rod 4. The lower end of piston cylinder 1 is closed by means of a cap 13 threadedly engaging the outer wall of the cylinder, cap 13 being provided with an annular series of air ports, as at 15. Disk element 14 is rotatably mounted on cap 13 and is provided with a similar series of air ports which may be brought into varying degrees of registry with ports 15 of cap 13 by rotation of disk element 14, thereby controlling the rate of flow of air through air ports 15. Bolt element 16 passes through disk element 14 and threadedly engages cap 13, serving to lock disk element 14 in the desired position of rotation with respect to cap 13.

The upper end of piston cylinder 1 threadedly engages housing 2, plate element 17 being rigidly secured between the end of piston cylinder 1 and a flange provided on the inner wall of housing 2, as shown. An annular series of air ports is provided in plate element 17, as at 18.

Conduit (not shown) leads from a source of compressed air (not shown) to the interior of the intake valve housing 19, as generally indicated at A. Conduit 24 leads in flow communication from the interior of intake valve housing A to the interior of the exhaust valve housing, as generally indicated at B. Flow of air through conduit 24 is controlled by means of intake valve 22 which seats on the interior of housing 19, as shown, intake valve stem 21 being slidably mounted in housing 19 and extending into the interior B of the exhaust valve housing. Spring 23 is positioned by means of pin element 48 mounted in housing 19 and a second pin element mounted on intake valve 22 and normally urges intake valve 22 to the closed position shown. A lubricating nipple 52 is provided in the housing mechanism 2 in communication with an annular oil well 53. A passage 25 leads from oil well 53 to valve A in order to supply lubrication to the parts.

Exhaust valve stem 34 is slidably mounted in sleeve 35, which, in turn, is rigidly mounted at the upper end of exhaust valve chamber B, valve head 37 seating on the lower end of sleeve 35. A plurality of conduits, as at 36, provides flow communication between exhaust valve chamber B and the atmosphere through actuating rod housing 3. Exhaust valve 37 is normally urged to closed position by means of spring element 42 which bears against plate element 17 and a flange which is formed as an integral part of an extension 33, rigidly attached to valve 37 and projecting towards plate element 17. A second extension element 40 is rigidly attached to the end of exhaust valve stem 34 and projects upwardly therefrom, terminating in a flange. Actuating rod 4 extends through extension element 40, valve stem 38 and extension element 33 in slidable relationship therewith.

The intake valve actuating mechanism comprises a handle member 26 which is pivotally mounted on housing 2 at 27, link member 29 which is pivotally attached to handle member 26, at 30, and similarly attached to a valve actuating arm 32, at 31. Valve actuating arm 32 is provided with a hole through the center thereof, through which extension element 33 passes. The upper face of the flange, on extension element 33, serves to support actuating arm 32, which is provided with upwardly extending projections on the sides thereof, as at 50, which slidably contact the top of valve 37, thereby securing actuating arm 32 against vibrational movement.

The arms of a bifurcated element 39 extend on each side of extension element 40 and bear against the end of exhaust valve stem 34, at 38. Bifurcated element 39 is pivotally mounted on the end of handle member 26, at 47, and is provided with an upwardly extending projection 51. A second projection 43 is rigidly mounted on, or formed as an integral part of, handle member 26 and is provided with an adjustment screw 45 which is secured in the desired position by means of nuts 44 and 46, screw 45 being adjusted to contact projection 51 of bifurcated element 39. Sleeve element 41 is rigidly and adjustably mounted on actuating rod 4.

The reciprocation of rod 4 and consequent opening and closing of the shear blades is brought about in the following manner: When handle member 26 is depressed, link 29 and actuating arm 32 are moved in a direction to contact intake valve stem 21 and open intake valve 22 against the pressure of spring member 23. Compressed air enters through conduit 20 and passes to exhaust valve chamber B, through conduit 24, and thence through ports 18 to the interior of piston cylinder 1, urging piston 11 downwardly against the pressure of spring 12, the air normally contained in piston cylinder 1 being discharged through ports 15. Rod 4, being rigidly attached to piston 11, moves downwardly therewith and moves shear blade 6, through link member 5, in a direction to close the shear blades. At a predetermined point in the downward travel of rod 4, sleeve element 41 contacts extension element 40 and thereby opens exhaust valve 37 against the pressure of spring 42. As exhaust valve 37 opens, actuating arm 32 moves downwardly therewith, pivoting about the connection with link 29, at 31, and slipping out of contact with intake valve stem 21, thereby permitting spring 23 to close intake valve 22. As the intake valve 22 closes under these conditions, intake valve stem 21 projects into exhaust valve chamber B to a point above actuating arm 32 (when the same has been moved downwardly by exhaust valve 37) and prevents closing of exhaust valve 37 until handle member 26 is released by the operator.

With the exhaust valve 37 open and intake valve 22 closed, the compressed air in piston cylinder 1, above piston 11, passes out of exhaust valve chamber B, through conduits 36, and is discharged to the atmosphere out of the end of actuating rod housing 3. Spring 12 acts to move piston 11 and actuating rod 4 upwardly, thereby returning the shear blades to the open position shown. Handle member 26 is then released, spring 28 urging the same outwardly and moving link 29 in a direction to move actuating arm 32 from beneath intake valve stem 21, whereby spring 42 acts to close exhaust valve 37. Thus, a single reciprocation of actuating rod 4 is brought about by depressing handle member 26, resulting in the opening and closing of the shear blades. A second reciprocation of actuating rod 4 will not take place, however, until handle member 26 has been released and again depressed by the operator.

In the event that the shears jam during the closing operation as a result of attempting to cut a heavy branch or for any other reason, the exhaust valve may be opened and the shear blades returned to open position in the following manner: Handle member 26 is manually pulled outwardly by the operator, thereby urging set screw 45 against projection 51 and forcing bifurcated element 39 downwardly against exhaust valve stem 36, and thus permitting escape of compressed air contained within exhaust valve chamber B and piston cylinder 1. It has been found advantageous to provide a spring at 28 which is slightly stronger than the spring at 42, as in this manner the exhaust valve is maintained slightly open and closing of the shears by slight leakage of air past intake valve 22 is avoided. When the intake valve is manually opened by means of handle 26, however, the pressure exerted on bifurcated element 39, by spring 28, is relieved, thereby permitting spring 42 to close completely exhaust valve 37 as intake valve 22 is opened.

The rate at which piston element 11 is moved upwardly by spring 12 may be varied as desired by adjustment of disk element 14, thus controlling the rate at which air is readmitted to piston cylinder 1 below piston element 11.

Among the numerous advantages which have been found to be inherent in the shear actuating mechanisms constructed in accordance with the principles illustrated above, the following may be cited in particular: The arrangement of the air exhaust system, whereby the air released from exhaust chamber B passes upwardly through actuating rod housing 2, serves to muffle the noise of the exhaust, prevents discharge of the cold air blast towards the operator, and, additionally, serves to blow dirt, twigs, leaves, or other foreign matter, from the interior of the actuating rod housing which would tend to interfere with the reciprocation of the actuating rod. The relatively large size and disposition of the exhaust valve provide rapid discharge of the air from the exhaust valve chamber, thus obviating the "hammering" often encountered in conventional shears at the end of the exhaust stroke. The arrangement, whereby the actuating rod passes through the exhaust valve and directly actuates the same, entirely eliminates timing problems during the reciprocation cycle of the actuating rod.

The construction of the intake valve actuating mechanism, whereby the exhaust valve is held in open position until the exhaust stroke of the actuating rod has been completed, assures rapid operation of the shears and permits the full force of spring 12 to act upon the actuating rod in opening the shear blades until the shear blades have opened to their full extent. The provision of an air cushion, beneath the piston element 11, brings about smooth and shockless operation of the shears both during opening and closing and the adjustable orifices provided at the bottom of piston cylinder 1 enable the operator to adjust the speed of operation of the shears as desired without changing the pressure of the air supplied to the air intake conduit.

Numerous additional advantages of the present shear construction will be apparent to those skilled in the art, and it will be appreciated that various modifications in mechanical detail may be embodied in shears constructed in accordance with the above set forth principles without departing from the spirit and scope of the invention as set forth in the appended claims.

I claim:

1. In shear actuating mechanisms of the class described, the combination comprising a cylinder and piston, a shear actuating rod rigidly attached to said piston, a valve mechanism for admitting and exhausting air from said cylinder, manually operated means actuating said valve mechanism to admit air under pressure to drive said piston downwardly in said cylinder, means comprising a spring biased tubular valve stem slidably mounted on said actuating rod in longitudinal coaxial relationship therewith and operated by said actuating rod as it reaches the end of its travel to exhaust air from said cylinder, and spring means normally urging said piston upwardly.

2. In shear actuating mechanisms of the class described, the combination comprising a cylinder and piston, a shear actuating rod rigidly attached to said piston, a valve mechanism for admitting and exhausting air from said cylinder, manually operated means actuating said valve mechanism to admit air under pressure to drive said piston downwardly in said cylinder, means comprising a spring biased tubular valve stem slidably mounted on said actuating rod in longitudinal coaxial relationship therewith and operated by said actuating rod as it reaches the end of its travel to exhaust air from said cylinder and simultaneously prevent further admission of air under pressure, and spring means normally urging said piston upwardly.

3. In shear actuating mechanisms of the class described, the combination comprising a cylinder and piston, a shear actuating rod rigidly attached to said piston, a valve mechanism for admitting and exhausting air from said cylinder, manually operated means actuating said valve mechanism to admit air under pressure to drive said piston downwardly in said cylinder, means comprising a spring biased tubular valve stem slidably mounted on said actuating rod in longitudinal coaxial relationship therewith and operated by said actuating rod as it reaches the end of its travel to exhaust air from said cylinder, adjustable orifice means at the lower end of said cylinder, and spring means contained in said cylinder normally urging said piston upwardly.

4. In shear actuating mechanisms of the class described, the combination comprising a cylinder and piston, a shear actuating rod rigidly attached to said piston, a valve mechanism for admitting and exhausting air from said cylinder, manually operated means actuating said valve mechanism to admit air under pressure to drive said piston downwardly in said cylinder, means comprising a spring biased tubular valve stem slidably mounted on said actuating rod in longitudinal coaxial relationship therewith and operated by contact means carried by said actuating rod as said rod reaches the end of its travel to exhaust air from said cylinder and simultaneously prevent further admission of air under pressure, adjustable orifice means at the lower end of said cylinder, and spring means contained in said cylinder normally urging said piston upwardly.

5. In shear actuating mechanisms of the class described, the combination comprising a cylinder and piston, a valve housing in flow communication with said cylinder, intake and exhaust valve means mounted in said valve housing, spring means normally urging said valve means to closed position, a shear blade actuating rod rigidly attached to said piston and extending through said valve housing, manually operated means actuating said intake valve to admit air under pressure to said valve housing to drive said piston downwardly in said cylinder, contact means carried by said actuating rod externally to said valve housing arranged and adapted to open said exhaust valve as said actuating rod reaches the end of its travel, and means operated by said exhaust valve to close said intake valve as said exhaust valve is opened by said contact means.

6. In shear actuating mechanisms of the class described, the combination comprising a cylinder and piston, a valve housing in flow communication with said cylinder, intake and exhaust valve means mounted in said valve housing, spring means normally urging said valve means to closed position, a shear blade actuating rod rigidly attached to said piston and extending through said valve housing, manually operated means actuating said intake valve to admit air under pressure to said valve housing to drive said piston downwardly in said cylinder, a sleeve element mounted on said actuating rod externally to said valve housing arranged and adapted to open said exhaust valve as said actuating rod reaches the end of its travel, and means operated by said exhaust valve to close said intake valve as said exhaust valve is opened by said sleeve element.

7. In shear actuating mechanisms of the class described, the combination comprising a cylinder and pistons, a valve housing in flow communication with said cylinder, intake and exhaust valve means mounted in said valve housing, spring means normally urging said valve means to closed position, a shear blade actuating rod rigidly attached to said piston and extending through said valve housing, manually operated means actuating said intake valve to admit air under pressure to said valve housing to drive said piston downwardly in said cylinder, a sleeve element mounted on said actuating rod externally to said valve housing arranged and adapted to open said exhaust valve as said actuating rod reaches the end of its travel, means operated by said exhaust valve to close said intake valve as said exhaust valve is opened by said sleeve element, and manually operated means actuating said exhaust valve means to exhaust air from said valve housing and said cylinder.

8. In shear actuating mechanisms of the class described, the combination comprising a cylinder and piston, a valve housing in flow communication with said cylinder, intake and exhaust valve means mounted in said valve housing, spring means normally urging said valve means to closed position, a shear blade actuating rod rigidly attached to said piston and extending through said valve housing, manually operated means carried by said exhaust valve means and actuating said intake valve to admit air under pressure to said valve housing and thereby drive said piston downwardly in said cylinder, and a contact element mounted on said actuating rod externally to said valve housing and adapted to open said exhaust valve when said actuating rod reaches the limit of its travel, said exhaust valve simultaneously moving said manually operated means in a direction to permit said intake valve means to close, said intake valve means upon closing contacting said manually operated means to hold said exhaust valve means open until said manually operated means is released.

9. In shear actuating mechanisms of the class described, the combination comprising a cylinder and piston, a valve housing in flow communication with said cylinder, intake and exhaust valve means mounted in said valve housing, spring means normally urging said valve means to closed position, a shear blade actuating rod rigidly attached to said piston and extending through said valve housing, manually operated means carried by said exhaust valve means and actuating said intake valve to admit air under pressure to said valve housing and thereby drive said piston downwardly in said cylinder, a contact element mounted on said actuating rod externally to said valve housing and adapted to open said exhaust valve when said actuating rod reaches the limit of its travel, said exhaust valve simultaneously moving said manually operated means in a direction to permit said intake valve means to close, said intake valve means upon closing contacting said manually operated means to hold said exhaust valve means open until said manually operated means is released, adjustable orifice means at the lower end of said cylinder, and spring means contained in said cylinder normally urging said piston upwardly.

10. In shear actuating mechanisms of the class described, the combination comprising a cylinder and piston, a valve housing in flow communication with said cylinder, an intake conduit leading in flow communication from a source of air under pressure to said valve housing, an intake valve controlling flow through said intake conduit, spring means normally urging said intake valve to closed position, an exhaust valve controlling flow of exhaust air from said valve housing, spring means normally urging said exhaust valve to closed position, a shear blade actuating rod rigidly attached to said piston and extending through said exhaust valve in slidable relationship therewith, manually operated means actuating said intake valve to admit air under pressure to drive said piston downwardly in said cylinder, means operated by said actuating rod as it reaches the end of its travel to open said exhaust valve and simultaneously close said intake valve, and spring means contained in said cylinder normally urging said piston upwardly.

11. In shear actuating mechanisms of the class described, the combination comprising a cylinder and piston, a valve housing in flow communication with said cylinder, an intake conduit leading in flow communication from a source of air under pressure to said valve housing, an intake valve controlling flow through said intake conduit, spring means normally urging said intake valve to closed position, an exhaust valve controlling flow of exhaust air from said valve housing, spring means normally urging said exhaust valve to closed position, a shear blade actuating rod rigidly attached to said piston and extending through said exhaust valve in slidable relationship therewith, an intake valve actuating element carried by said exhaust valve, handle means mounted externally with respect to said valve housing, link means attached to said handle means and pivotally attached to said intake valve actuating element, whereby said intake valve is opened by manipulation of said handle means, and a contact element rigidly mounted on said actuating rod and adapted to open said exhaust valve when said piston reaches a predetermined point in its travel, said exhaust valve simultaneously moving said intake valve actuating element in a direction to permit closing of said intake valve, said intake valve upon closing contacting said intake valve actuating element to prevent closing of said exhaust valve until said handle means is released.

12. In shear actuating mechanisms of the class described, the combination comprising a cylinder and piston, a valve housing in flow communication with said cylinder, an intake conduit leading in flow communication from a source of air under pressure to said valve housing, an intake valve controlling flow through said intake conduit, spring means normally urging said intake valve to closed position, an exhaust valve controlling flow of exhaust air from said valve housing, spring means normally urging said exhaust valve to closed position, a shear blade actuating rod rigidly attached to said piston and extending through said exhaust valve in slidable relationship therewith, an intake valve actuating element carried by said exhaust valve, handle means mounted externally with respect to said valve housing, link means attached to said handle means and pivotally attached to said intake valve actuating element, whereby said intake valve is opened by manipulation of said handle means, a contact element rigidly mounted on said actuating rod and adapted to open said exhaust valve when said piston reaches a predetermined point in its travel, said exhaust valve simultaneously moving said intake valve actuating element in a direction to permit closing of said intake valve, said intake valve upon closing contacting said intake valve actuating element to prevent closing of said exhaust valve until said handle means is released, and an actuating element attached to said handle means and contacting said exhaust valve, whereby said exhaust valve may be manually opened by manipulation of said handle means.

13. In shear actuating mechanisms of the class described, the combination comprising a cylinder and piston, a valve housing in flow communication with said cylinder, an intake conduit leading in flow communication from a source of air under pressure to said valve housing, an intake valve controlling flow through said intake conduit, spring means normally urging said intake valve to closed position, an exhaust valve controlling flow of exhaust air from said valve housing, spring means normally urging said exhaust valve to closed position, a shear blade actuating rod rigidly attached to said piston and extending through said exhaust valve in slidable relationship therewith, an intake valve actuating element carried by said exhaust valve, handle means mounted externally with respect to said valve housing, link means attached to said handle means and pivotally attached to said intake valve actuating element, whereby said intake valve is opened by manipulation of said handle means, a contact element rigidly mounted on said actuating rod and adapted to open said exhaust valve when said piston reaches a predetermined point in its travel, said exhaust valve simultaneously moving said intake valve actuating element in a direction to permit closing of said intake valve, said intake valve upon closing contacting said intake valve actuating element to prevent closing of said exhaust valve until said handle means is released, an actuating element attached to said handle means and contacting said exhaust valve, whereby said exhaust valve may be manually opened by manipulation of said handle means, adjustable orifice means at the lower end of said cylinder, and spring means normally urging said piston upwardly in said cylinder.

14. In shear actuating mechanisms of the class described, the combination comprising a cylinder and piston, a valve housing in flow communication with said cylinder, an intake conduit leading in flow communication from a source of air under pressure to said valve housing, an intake valve controlling flow through said intake conduit, spring means normally urging said intake valve to closed position, an exhaust valve controlling flow of exhaust air from said valve housing, spring means normally urging said exhaust valve to closed position, a shear blade actuating rod rigidly attached to said piston and extending through said exhaust valve in slidable relationship therewith, an intake valve actuating element carried by said exhaust valve, handle means mounted externally with respect to said valve housing, link means attached to said handle means and pivotally attached to said intake valve actuating element, whereby said intake valve is opened by manipulation of said handle means, a contact element rigidly mounted on said actuating rod and adapted to open said exhaust valve when said piston reaches a predetermined point in its travel, said exhaust valve simultaneously moving said intake valve actuating element in a direction to permit closing of said intake valve, said intake valve upon closing contacting said intake valve actuating element to prevent closing of said exhaust valve until said handle means is released, an actuating element attached to said handle means and contacting said exhaust valve, whereby said exhaust valve may be manually opened by manipulation of said handle means, and spring means normally urging said handle means in a direction to open said exhaust valve, said last named spring means being sufficiently stronger than the spring means urging said exhaust valve to closed position to maintain said exhaust valve slightly open when the actuating mechanism is at rest.

PRESSLEY P. MOTHORN.

REFERENCES CITED

The following references are of record in the file of this patent:

UNITED STATES PATENTS

| Number | Name | Date |
| --- | --- | --- |
| 375,200 | Ross | Dec. 20, 1887 |
| 840,876 | Steedman | Jan. 8, 1907 |
| 1,180,238 | Carbis | Apr. 18, 1916 |
| 1,181,058 | Bashaw | Apr 25, 1916 |
| 1,565,262 | Costa | Dec. 15, 1925 |
| 2,028,938 | Logette | Jan. 28, 1936 |
| 2,054,550 | Thompson | Sept. 15, 1936 |
| 2,159,879 | Dewandre | May 23, 1939 |
| 2,391,676 | Browning | Dec. 25, 1945 |